Patented Jan. 17, 1933

1,894,775

UNITED STATES PATENT OFFICE

HERBERT S. LEVENSON, OF BROOKLYN, NEW YORK

THERMAL COMPOSITION OF MATTER

No Drawing.  Application filed April 12, 1929. Serial No. 354,703.

This invention relates to heat supplying and heat absorbing compositions, and is particularly designed to eliminate the use of water with the composition, when used for heating purposes.

Compositions adapted to be used for supplying heat over a considerable period of time, have heretofore been used for therapeutic purposes, as for instance, in various types of containers such as hot water bags or bottles, and in ice bags or bottles, and insofar as I am aware, the addition of water has usually been necessary in order to make said compositions effective.

My invention contemplates the provision of a composition for supplying heat, such as avoids necessity for the addition of water thereto. I am consequently able to avoid the injurious effect which the water has upon the rubber container in which such compositions are usually employed.

My invention further contemplates the provision of a composition adapted for use alternately, as a heater and as a cooler. When the composition is to be used for cooling purposes, however, it is intended that a small quantity of a suitable solvent, such as alcohol be added, or if alcohol is not available, then water may be used. It is further intended that the alcohol or water be eliminated as by evaporation when the composition is to be used for heating.

The various objects of my invention will be clear from the description which follows, wherein the various types of ingredients and the proportions thereof have been set forth as illustrative of my invention, it being understood that I do not intend to limit myself to the specific ingredients or to the exact proportions specified hereinafter.

Quite a large number of different substances are adapted for use as ingredients in my improved composition. I have found, however, that any ingredient which may be used should have the following properties:

First, the ingredient should be capable of giving up its latent heat for a comparatively long period of time when changing from a liquid to its solid or crystallized state; second, it should have the additional property of dissolving slowly in a solvent liquid such as alcohol or water and at the same time absorbing heat while so dissolving.

I have found by testing a large number of substances that among the substances which have these properties and which are therefore suitable for use in my improved composition, are the following:

*Sodium salts*

Sodium acetate
Sodium carbonate
Sodium chloride
Sodium nitrate
Sodium phosphate
Sodium sulphate
Sodium thiosulphate

*Ammonium salts*

Ammonium carbonate
Ammonium chloride
Ammonium nitrate
Ammonium sulphate
Ammonium thiocyanate
Ammonium thiosulphate

*Potassium salts*

Potassium chloride
Potassium iodide
Potassium nitrate
Potassium sulphocyanate

I prefer, however, to use sodium carbonate, sodium thiosulphate, sodium sulphate, sodium acetate, ammonium thiosulphate and ammonium nitrate, either in combination or separately, though it will be understood that these substances may be used in a wide variety of different proportions as the principal ingredients of my improved composition.

For example, I may use substantially equal quantities of sodium sulphate, sodium thiosulphate, sodium carbonate and sodium acetate, particularly, though not necessarily, if the composition is to be used as a heater only; or I may use substantially equal quantities of sodium sulphate, sodium carbonate and sodium acetate; or I may use any two of the substances mentioned.

It will be understood that one or another of the above-named ingredients may be used alone, or said ingredients may be used in various combinations and in various proportions. I have found, however, that by combining more than two of the ingredients mentioned, I am able to obtain the most satisfactory results since the heating and cooling properties of an ingredient seems to be augmented in the presence of other ingredients.

I have found that for a temperature of approximately 128° F., the proportions given above give the most satisfactory results for the longest period. It will be understood, however, as above indicated, that the number of the ingredients may be considerably varied as well as the proportions thereof, as will be understood by those skilled in the art.

Since compositions of this type are designed to be most generally used for therapeutic purposes in any type of suitable container, such as in rubber hot water or ice bags, I prefer to add to the composition about 1% of a suitable oil having a paraffin base, such as atlas oil, particularly, if the composition is to be used for heating only. The oil prevents the accumulation during solidification or crystallization of the composition about the mouth of the container into which it is inserted, thereby preventing clogging of the opening in the container, and further allows access of air to the composition retained in the container. I have found that glycerine also serves this purpose quite well, so that glycerine may be substituted for the atlas oil, and either or both of these ingredients may be used if desired, in equal or other proportions.

In order to use my improved composition for purposes of supplying heat at higher than body temperatures, the composition is inserted into a suitable container such as a rubber hot water bag, in the desired quantities. Just before use, the stopper of the container is removed, so that any vapors generated inside of the container may be expelled, the composition thoroughly aerated, and the excitation of the composition desirable to start the crystallizing action thereby effected. This is usually accomplished in about one minute. The stopper of the container is then replaced, and the container inserted into hot water having a temperature of at least 180° F., and preferably at boiling temperature. The container is thereby heated for a period sufficient to melt or fuse the composition. This period depends somewhat on the quantity of the composition used, and the area exposed to the heat. I have found that about five to ten minutes of immersion in boiling water is usually sufficient to fuse the composition, which takes up or absorbs the heat from the surrounding heated medium and supplies heat at higher than body temperatures for a considerable period due to its property of solidifying or crystallizing slowly, and thereby giving off its latent heat slowly. I have also found that the time for the melting of the composition and the time for its absorption of heat is greatly lessened by friction or by shaking the container, thus also bringing the interior crystals nearer the heating medium.

Heat is given up by the composition for a period of about twelve hours at a temperature of about 128° when the container is kept in contact with the body of the user and thereby obtains the advantage of the body heat. This temperature of 128° is sufficiently higher than body temperatures to be effective for therapeutic purposes without danger of burning or scalding the patient. Heat is given up by the composition during the entire period of re-crystallization or solidification. The temperature may be increased temporarily by friction, as by pressing or shaking the container. The oil or glycerine in the composition acts as a preventative against adhesion so that on shaking the container, there is no danger of the crystals hardening about or clogging the mouth of the container.

If it is desired to use my improved composition only for the purpose of cooling, or absorbing heat, or in an "iceless" ice bag, I find that it is preferable that a little solvent liquid, such as alcohol, or if necessary, water, be added to the composition before it is used. The composition in such a case may include about 75% by weight of ammonium thiosulphate and the remainder, about equal parts of sodium thiosulphate, ammonium nitrate, sodium sulphate and sodium carbonate. It will be understood, however, that one or more of the ingredients just named may be omitted. For instance, I may use only ammonium thiosulphate, sodium sulphate and sodium carbonate; or I may use ammonium nitrate, sodium sulphate and sodium carbonate, or I may use ammonium nitrate, sodium sulphate and sodium thiosulphate with satisfactory results. The ingredients act better when in combination than if only one ingredient were used by itself. The proportions of the various ingredients, however, are subject to wide variation with substantially equally satisfactory results.

To use my improved composition as a cooler, a sufficient quantity as desired is placed into a suitable container, such as an ice bag, the stopper of the bag being left open about ten minutes to thoroughly aerate the composition, and to start the dissolving action. The stopper is then replaced. After the container and its contents have been thoroughly aerated, a small amount of alcohol or water is added. As the composition slowly dissolves in the liquid thus supplied, it absorbs heat from the body of the user and reduces the temperature of the parts with which it is in contact about 60° F., or from about fever heat to about 40° F. The cooling effect is maintained for about six hours.

It will be understood that my improved composition may be used as a heater after it has been used for cooling purposes provided that the previously added liquid is first eliminated, as by boiling or otherwise, in a manner well known in the art.

If the composition is boiled as in a double boiler, not only is the liquid evaporated, but the composition absorbs a sufficient amount of heat to allow it to be used immediately after the elimination of the liquid, for heating purposes. After the composition has again crystallized or solidified, it may again be used for cooling purposes by merely aerating the composition and again adding a small quantity of liquid.

It will be seen that I have produced an improved composition well adapted for the purpose of supplying or absorbing heat for heating or cooling purposes; that the composition does not injure the container into which it is inserted; that it may be used repeatedly without deterioration, and may be used alternately as a heater and cooler by merely alternately adding and evaporating the liquid of solution, and that it is well adapted for the purposes for which it is intended. I do not wish to be understood as limiting myself to the specific ingredients or proportions specified as it will be understood that I intend to claim my invention as broadly as may be permitted by the state of the prior art and the terms of the appended claims.

I claim:

1. A thermal agent free of added solvent liquid, comprising at least two sodium salts, each having the property of giving up latent heat slowly during crystallization and a small quantity of a substance selected from a group consisting of atlas oil and glycerine.

2. In a thermal agent adapted to give up heat during crystallization, and free of added water, a small quantity of a non-aqueous liquid selected from a group consisting of atlas oil and glycerine.

3. In a thermal agent adapted to give up heat during crystallization, a small quantity of a substance selected from a group consisting of atlas oil and glycerine.

4. In a thermal agent adapted to give up heat during crystallization, a small quantity of glycerine.

5. In a thermal agent, sodium sulphate, sodium carbonate and glycerine.

6. In a thermal agent, sodium sulphate, sodium carbonate, and a liquid selected from a group consisting of glycerine and atlas oil.

7. In a thermal agent, sodium thiosulphate, sodium carbonate, sodium acetate and a small quantity of an adhesion preventing liquid in which the sodium salts mentioned are insoluble and selected from a group consisting of atlas oil and glycerine.

8. In a thermal agent free of added solvent liquid, a sodium salt capable of giving up latent heat slowly during crystallization and glycerine.

HERBERT S. LEVENSON.